US008914884B1

(12) United States Patent  
Kogan et al.

(10) Patent No.: US 8,914,884 B1  
(45) Date of Patent: Dec. 16, 2014

(54) SYSTEM AND METHODS FOR PROTECTING DATA FROM INPUT DEVICES

(71) Applicant: Kaspersky Lab ZAO, Moscow (RU)

(72) Inventors: Sergey V. Kogan, Moscow (RU); Igor S. Maslov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/336,655

(22) Filed: Jul. 21, 2014

(30) Foreign Application Priority Data

Apr. 18, 2014 (RU) .............................. 2014115458

(51) Int. Cl.
*H04L 29/06* (2006.01)
*G06F 21/00* (2013.01)
*G06F 21/10* (2013.01)

(52) U.S. Cl.
CPC ...................................... *G06F 21/10* (2013.01)
USPC ................................. 726/22; 726/26; 713/188

(58) Field of Classification Search
CPC ......... G06F 21/56; G06F 21/55; G06F 21/00; G06F 21/50; H04L 63/0428
See application file for complete search history.

(56) References Cited

U.S. PATENT DOCUMENTS 7,024,546 B2    4/2006 Real

FOREIGN PATENT DOCUMENTS

WO    9844411    10/1998

*Primary Examiner* — Izunna Okeke
(74) *Attorney, Agent, or Firm* — Arent Fox LLP; Michael Fainberg

(57) ABSTRACT

Disclosed are system, methods and computer program product for secure transfer of data from an input device. An example method includes receiving first data by a driver of the input device; interpreting the first data into second data by the driver; sending the second data to a driver filter of an antivirus software; determining, by the antivirus software, whether the second data is associated with a user interface application protected by the antivirus software; when the second data is associated with a protected application, bypassing an operating system and sending the second data to the user interface application; sending the second data by the user interface application to a Text Services Framework (TSF) software; processing the second data by the TSF software to generate third data; sending the third data by the TSF software to the user interface application for display on a user interface.

17 Claims, 5 Drawing Sheets

SYSTEM AND METHODS FOR PROTECTING DATA FROM INPUT DEVICES

CROSS-REFERENCE TO RELATED APPLICATIONS

The present disclosure claims benefit of priority under 35 U.S.C. 119(a)-(d) to a Russian Application No. 2014115458 filed on Apr. 18, 2014, which is incorporated by reference herein.

FIELD OF TECHNOLOGY

The present disclosure relates generally to systems and methods of data protection, and more specifically, to protecting data from Input devices against unauthorized access.

BACKGROUND

In modern operating systems of the Microsoft® Windows® family, data from input devices (such as a joystick, game controller, keyboard, mouse, tablet, touch screen, touch pad, track ball and so on) is transmitted to the operating system, which then transmits it to the applications without any sort of preliminary processing to enhance the security (such as the use of encryption, security policies, and so on). As a result, it is possible to obtain unauthorized access to the information being entered by the user through one of the following techniques:
  using WinAPI event listeners from the input devices;
  using the actual drivers of the input devices installed in the system.

The aforementioned technologies are used by malicious programs, such as so-called keyboard loggers (Trojan keyloggers). Once introduced into the operating system, they track the user's input in real time in order to steal the user's confidential data, such as logins, passwords, account numbers and so on.

The problem of the security of user input is partly solved by antivirus programs, which introduce into the operating system their own driver filter, which single-handedly receives data directly from the device driver and transmits it to the necessary application bypassing the operating system. In this way, the user's input is protected by the antivirus programs against unauthorized access to the information being transmitted.

The drawback to this operating scheme is that it makes it hard to correctly enter texts in non-English language, such as East Asian languages, handwritten text or voice input. One such example is the composing of a text using Chinese characters. Since the characters cannot be entered directly from the keyboard, the Microsoft® Windows® operating system provides a number of possibilities for writing characters by composing a certain sequence of symbols related to the character and then selecting the appropriate character from the list.

When using the above-described data protection technology, if one attempts to enter a Chinese character in the entry field only the set of symbols will be shown from which the operating system would have attempted to form the character, but since the data entry was done bypassing the operating system this did not occur.

Another way of partially solving the problem of user input security is implemented in the Microsoft® Windows® operating systems starting with Microsoft® Windows® 2000 with the introduction of Text Services Framework (TSF)—a framework enabling entry of text independent of language and input device. When using TSF, applications can receive the text being entered without knowing the details of implementation of the input device (for example, by means of speech recognition or handwritten entry). The TSF technology provides data transfer security from the TSF manager to the application using TSF.

This operating scheme ensures a secure transfer of data from the TSF manager to the application, e.g., a malicious program cannot gain access thereto (due to the operating features of the TSF). However, the transfer of data from the input device to the TSF manager may be vulnerable to unauthorized access.

Accordingly, while some conventional approaches solve certain problems in the area of protection of data obtained from input devices, they have a number of drawbacks, e.g., the inability to process nonstandard data (such as the entry of Asian characters) with a reliable data transmission channel or the unreliability of the data transmission channel with full support of entry of nonstandard data.

SUMMARY

Disclosed are aspects of systems, methods and computer program products for protecting computer systems against unauthorized access to data obtained from input devices and being transmitted to applications for further processing (for example, for display in entry fields and so on). One technical result of the present disclosure is to heighten the security of data being transmitted from input devices to applications.

In one aspect, an example method is provided for secure transfer of data from an input device to a user interface application. The method comprises receiving first data by a driver of the input device, the first data being input by a user via the input device; interpreting the first data into second data by the driver of the input device; sending the second data by the driver to a driver filter of an antivirus software; determining, by the antivirus software, whether the second data is associated with a user interface application protected by the antivirus software; when the second data is associated with a user interface application protected by the antivirus software, bypassing an operating system and sending the second data to the user interface application by the antivirus software; sending the second data by the user interface application to a Text Services Framework (TSF) software; processing the second data by the TSF software to generate third data; sending the third data by the TSF software to the user interface application; and displaying the third data on a user interface by the user interface application.

In one aspect, the first data comprises one or more of: a text in a non-English language, a handwritten input, and a voice input.

In another aspect, the second data comprises commands comprehensible to the operating system.

In another aspect, the third data comprises human readable and editable text.

In another aspect, the input device is a peripheral for entering data or signals.

In another aspect, determining, by the antivirus software, whether to send the second data to the user interface application is performed based on an operating mode of the antivirus software.

In another aspect, determining, by the antivirus software, whether to send the second data to the user interface application comprises: determining whether the user interface application is on a list of applications protected by the antivirus software; and when the user interface application is on the list of applications protected by the antivirus software, determining to send the second data to the user interface application.

In another aspect, an example system for secure transfer of data from an input device to an application comprises a processor configured to: receive first data by a driver of the input device, the first data being input by a user via the input device; interpret the first data into second data by the driver of the input device; send the second data by the driver to a driver filter of an antivirus software; determine, by the antivirus software, whether the second data is associated with a user interface application protected by the antivirus software; when the second data is associated with a user interface application protected by the antivirus software, bypass an operating system and send the second data to the user interface application by the antivirus software; send the second data by the user interface application to a Text Services Framework (TSF) software; process the second data by the TSF software to generate third data; send the third data by the TSF software to the user interface application; and display the third data on a user interface by the user interface application.

In a further aspect, an example computer program, stored on a non-transitory computer-readable storage medium, comprising computer-executable instructions for secure transfer of data from an input device to a user interface application, including instructions for: receiving first data by a driver of the input device, the first data being input by a user via the input device; interpreting the first data into second data by the driver of the input device; sending the second data by the driver to a driver filter of an antivirus software; determining, by the antivirus software, whether the second data is associated with a user interface application protected by the antivirus software; when the second data is associated with a user interface application protected by the antivirus software, bypassing an operating system and sending the second data to the user interface application by the antivirus software; sending the second data by the user interface application to a Text Services Framework (TSF) software; processing the second data by the TSF software to generate third data; sending the third data by the TSF software to the user interface application; and displaying the third data on a user interface by the user interface application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for secure transfer of data from an input device to a user interface application. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Some example aspects provide secure transfer of data from an input device to a user interface application by using both a driver filter of an antivirus software and a Text Services Framework (TSF) software. Accordingly, secure transfer of data is provided for proper display of user input that requires the use of TSF software, such as input texts in East Asian languages, handwritten input, or voice input.

As used herein, framework for text input from input devices is a program interface that allows to enter text independent of the input device. Applications can obtain the text entered without knowing the details about the implementation of the input device.

Text services as used herein are software functioning as a provider of text to applications.

Manager of a framework for text input from input devices as used herein is a manager acting as an intermediate link between an application and one or more text services, controlling the text services and enabling the application and the text services to share text.

Figure 1:
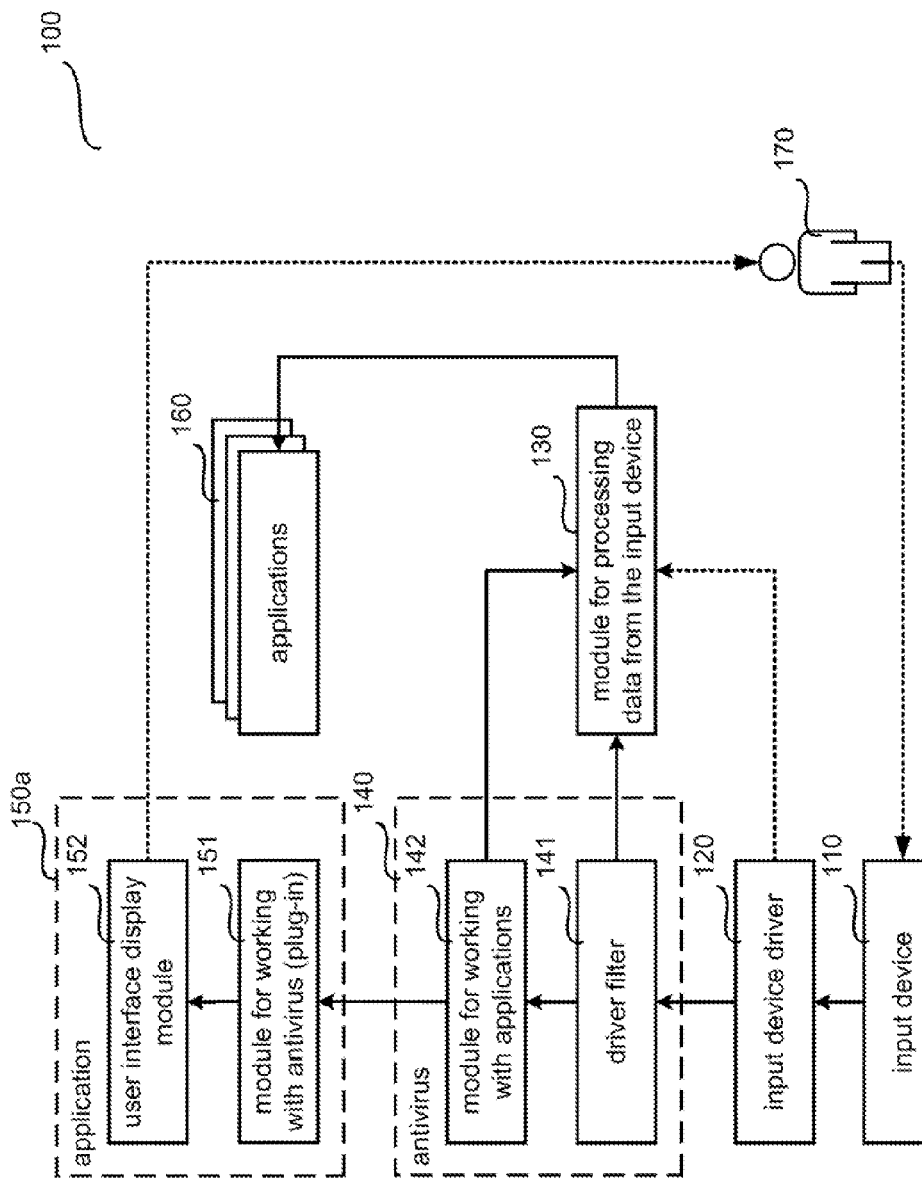
FIG. 1 shows the structural diagram of an example conventional system for secure transfer of data from input devices to an application with the use of a driver filter of an antivirus software.

FIG. 1 shows an example conventional system for protected transfer of data from an input device to application interface elements. The system 100 includes an input device 110, an input device driver 120, a module for processing data from the input device 130, an antivirus 140, an application 150a (such as the browsers Internet Explorer, Mozilla Firefox, Google Chrome and so on), a group of applications 160 and the user 170.

The input device 110 may be a peripheral device, such as a joystick, game controller, keyboard, mouse, tablet, touch screen, touch pad, track ball, and the like, used for entering data or signals into a computer or some other electronic device during its operation. The input device 110 transmits the physical action of the user (such as the movement with a mouse, the typing of keys on a keyboard, clicking on an area of a touch screen, and so on) in the form of electrical signals to the computer, where the received signals are interpreted by the input device driver 120 as commands or data comprehensible to the operating system.

The input device driver 120 may be a component of the operating system and is configured to receive a signal from the input device 110, process and interpret the received signal, and relay it in the form of commands comprehensible to the operating system for further use to the antivirus driver filter 141 or, if no driver filter is installed in the system, to the module for processing data from the input device 130.

The module for processing data from the input device 130 may be a component of the operating system configured to receive commands for the operating system from the input device driver 120, the driver filter 141 or the module for working with applications 142 of the antivirus 140, and to organize and serve a queue of applications 160 by consecutively providing them with data from the devices.

The antivirus 140 may be a software program for detecting malicious software and restoring files modified by such programs, and also for preventing the modification of files or the operating system by malicious code.

The antivirus 140, such as a Kaspersky® Antivirus or other type of antivirus software, may include a driver filter 141 and a module for working with applications 142.

The driver filter 141 may be a component of the antivirus 140 configured to intercept user input commands from the input device driver 120 and, depending on the operating mode of the antivirus 140, where different operating modes specify where to forward the intercepted user input commands, forward the user input commands (i) only to the module for working with applications 142, thus bypassing the operating system, or (ii) only to the module of operating system for processing data from the input device 130 or (iii) to both modules 142 and 130 at the same time. Generally, bypassing of the operating system refers to actions in which processing of received user commands does not involve some of the typically-used handlers of the operating system. For example, in a typical working scenario, when a user types HELLO using keyboard, the keyboard driver will pass the string of characters to the operating system, which will interprete the characters as appropriate text characters, and forward them to all applications waing in a queue to receive data from the keyboard. In contrast, during bypassing of the operating system, and driver filter 141 will intercept data input command from the keyboard and forward it directly to the antivirus 140, which in turn will forward it to the appropriate application via the module for working with application 142. The application that receives the input data will 'think' that the data was received from the operating system through standard handlers, but the operating system will not know that any user input took place and that the user input data was forwarded to one of the applications.

The module for working with applications 142 is a component of the antivirus 140 configured to receive data from the driver filter 141, determine for which application or for which application element (such as the entry field of a browser) this data is intended, prepare the data and relay it the same way as the operating system would have to the required application 150a, if the application is on the list of applications whose input is protected by the antivirus 140, or relay the data to the module of the operating system for processing data from the input device 130, if the application is not on that list.

The application 150a is a software program for performing certain user tasks and is configured to interact directly with the user. In one example aspect, the application 150a may be a browser (such as Microsoft Internet Explorer, Mozilla Firefox, Google Chrome). A browser is a specialized software program for viewing web sites, that is, for retrieving web pages, processing them, outputting them and moving from one page to another.

The application 150a includes a module for working with the antivirus 151 and a user interface display module 152.

The module for working with the antivirus 151 is a component of the antivirus 140, which may be connected to the application 150a as a plug-in and configured to receive data from the module for working with applications 142 of the antivirus 140, process it and relay it to the user interface display module 152.

The user interface display module 152 is a component of the application 150a configured to display various interface elements (such as keys, entry fields, and so on) in the application's window.

The applications 160 are available programs (e.g., active programs in the main memory) configured to perform certain user tasks and provide direct interaction with the user 170.

The user 170 is a person who is interacting with the application 150a by receiving (e.g., visual) data from the user interface display module 152 and manipulating (e.g., entering, changing, and so on) such data through use of the input device 110.

The system 100 for protected transfer of data from an input device, such as a keyboard, to application input elements, such as a browser, may operate as follows:

The user 170 via the browser 150a goes to his bank site, for example, and enters confidential information in the entry field. By pressing keys on the keyboard 110, signals from the keyboard 110 go to the computer and the keyboard driver 120. The keyboard driver 120 interprets the signals in the form of data comprehensible to the operating system (such as the scan code of a key and the pressed or released status type) and sends this to the driver filter 141. The driver filter 141 of the antivirus 140 intercepts the data from the keyboard driver 120 and relays it, depending on the operating mode of the antivirus 140, to the module for working with applications 142 or to the module of operating system for processing data from the input device 130. The module for working with applications 142 receives the data from the driver filter 141, checks whether the data is intended for the browser 150a and relays it bypassing the operating system to the module for working with the antivirus 151 of the browser 150a or to the module for processing data from the input device 130, if the data is intended for another application 160. The module for working with the antivirus 151 receives the data from the module 142, processes it (for example, converts the series of received symbols into text form) and relays it to the user interface display module 152 for proper display in the browser 150a. The user interface display module 152 receives data which needs to be displayed from the module for working with the antivirus 151, processes it (for example, changes all text to upper case, breaks the text up into groups of words, and so on) and displays it in the browser (for example, on the page of the site being displayed) for visual reading by the user 170.

During the performance of the chain of operations from the user pressing a key on the keyboard to the outputting of a symbol into the entry field on the web page in the browser, the data (e.g., the identifier and the status of the key) is protected against unauthorized access of foreign software. Since the driver filter 141 of the antivirus 140 intercepts the data directly from the input device driver 120 (due to the fact that the driver filter is registered in the system immediately after the input device driver), malicious software cannot obtain data from the input device 110 at this stage, and since the antivirus 140 protects its data streams from outside intervention, it is impossible to intercept the data either within the antivirus 140 itself or on the way from the antivirus 140 to the browser 150a.

However, it may not be possible to correctly enter texts in non-English language, such as East Asian languages, handwritten text or voice input. One such example is the composing of a text using Chinese characters. Since the characters cannot be entered directly from the keyboard, the Microsoft® Windows® operating system provides a number of possibilities for writing characters by composing a certain sequence of symbols related to the character and then selecting the appropriate character from the list.

When using the above-described data protection technology, if one attempts to enter a Chinese character in the entry field only the set of symbols are shown from which the operating system would have attempted to form the character, but since the data entry was done bypassing the operating system this did not occur.

Another way of partially solving the problem of user input security was implemented in the Microsoft® Windows® operating systems start with Microsoft® Windows® 2000 with the introduction of the above-mentioned Text Services Framework (TSF), which enables entry of text independent of language and input device. When using TSF, applications can receive the text being entered without knowing the details of implementation of the input device (for example, by means of speech recognition or handwritten entry). The TSF technology provides data transfer security from the TSF manager to the application using TSF.

Figure 2:
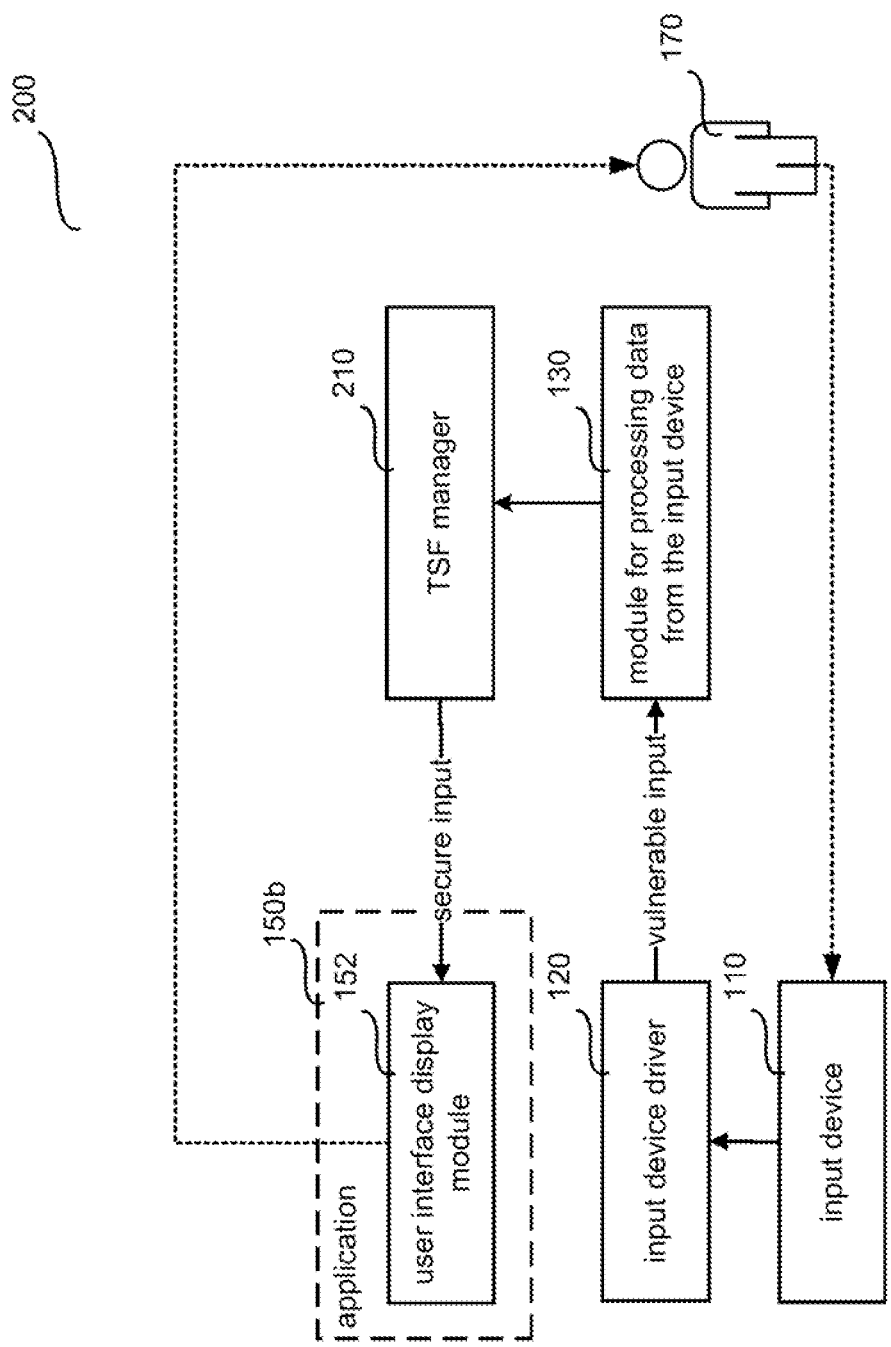
FIG. 2 shows the structural diagram of an example conventional system for secure transfer of data from input devices to an application using TSF technology.

FIG. 2, showing another example conventional system for protected transfer of data from an input device to application interface elements using TSF.

This example system 200 for protected transfer of data from an input device to application interface elements includes an input device 110, an input device driver 120, a module for processing data from the input device 130, a TSF manager 210, an application 150b (such as a browser), and the user 170.

The TSF manager 210 is a component of the operating system configured to receive data from the module for processing data from the input device 130, process it, and send the result via a protected channel to the application 150b. The processing of the data may include, when receiving Chinese characters from the user device, determining possible variants of the Chinese characters, providing the user with an interface for their selection or editing and transforming the input into the UNICODE symbol of the corresponding character. The TSF manager 210 may perform other operations known to those skilled in the art.

The application 150b includes a user interface display module 152.

This example system 200 for protected transfer of data from an input device, such as a keyboard, to application input elements, such as a browser, operates as follows:

The user 170 via the browser 150b goes to his bank site, for example, and enters confidential information in the entry field. By pressing keys on the keyboard 110, signals from the keyboard 110 go to the computer and the keyboard driver 120. The keyboard driver 120 interprets the signals in the form of commands comprehensible to the operating system and sends these to the module for processing data from the input device 130. The module for processing data from the input device 130, on the basis of a formed queue of applications awaiting data entry, sends the data to the TSF manager 210 (if the corresponding application in the queue supports this technology). The TSF manager 210 determines which type of data is required (such as Chinese characters) and, depending on this, it processes the received data and transforms it accordingly, if necessary providing the user with an interface for manipulating the data (for example, for selecting which character was entered), determines for which component of the browser interface 150b the processed data is intended (for example, the user is entering text in the entry field of a web page) and sends it to the user interface display module 152 for proper display in the browser 150b. The user interface display module 152 obtains the data which it needs to display from the TSF manager 210, processes it, and displays it in the browser (for example, on the web page being displayed).

This operating scheme ensures a secure transfer of data from the TSF manager to the application, e.g., a malicious program cannot gain access thereto (due to the operating features of the TSF). However, the transfer of data from the input device to the TSF manager may be vulnerable to unauthorized access.

Figure 3:
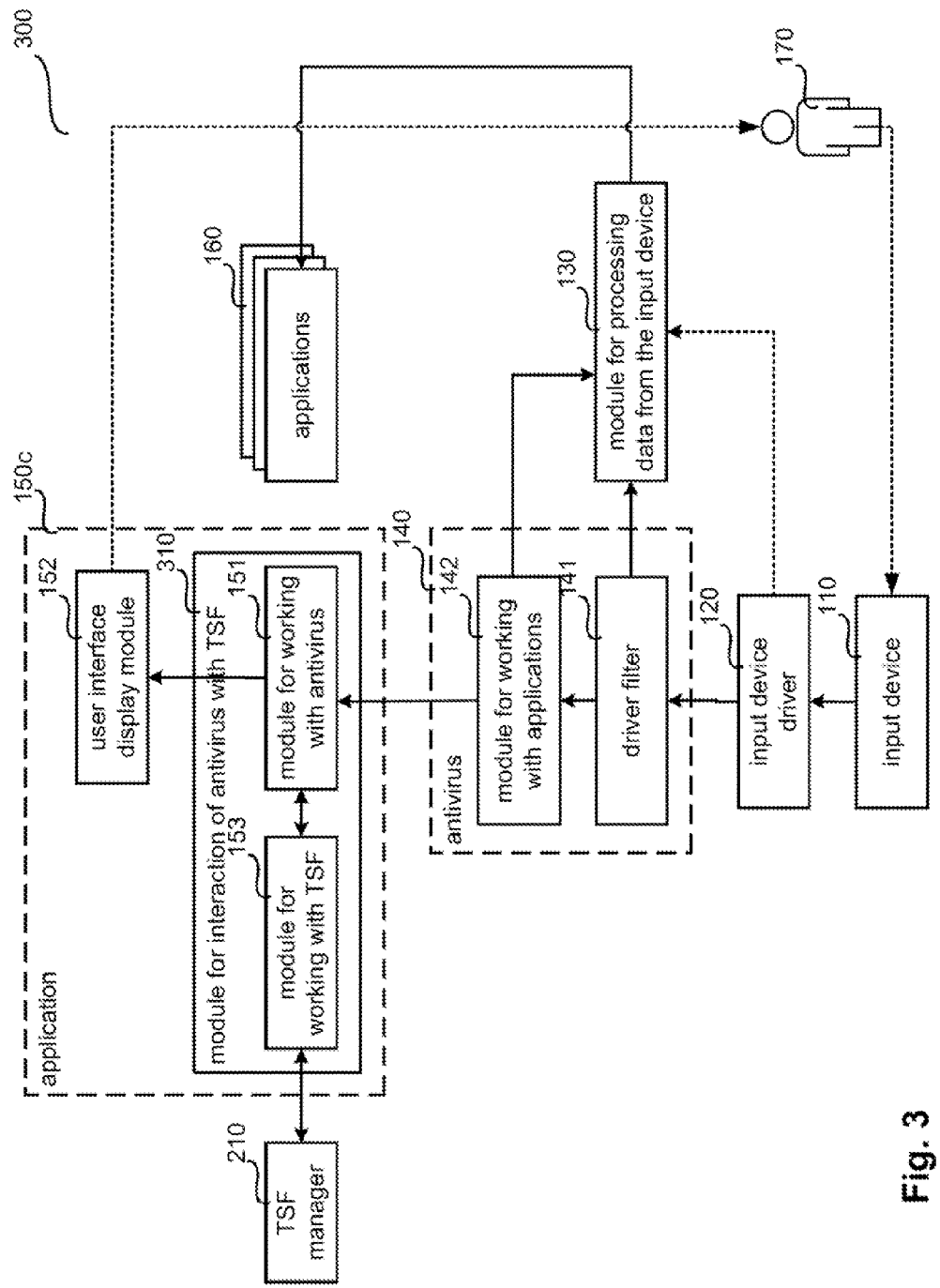
FIG. 3 shows the structural diagram of an example system for secure transfer of data from input devices to an application with the use of the driver filter of an antivirus product and the TSF technology according to one example aspect of the present invention.

FIG. 3 shows the structural diagram of an example system for secure transfer of data from input devices to an application with the use of the driver filter of an antivirus product and the TSF technology according to one example aspect of the present invention.

The structural diagram of the example system 300 for secure transfer of data from an input device to an application with the use of the driver filter of an antivirus software and the TSF technology includes an input device 110, an input device driver 120, a module for processing data from the input device 130, an antivirus 140, an application 150c (such as a browser), a group of other applications 160, a user 170 and a TSF manager 210.

The application 150c includes a user interface display module 152 and a module for interaction of the antivirus with the TSF 310.

The module for interaction of the antivirus with the TSF 310 includes a module for working with the antivirus 151 and a module for working with the TSF 153.

In one example aspect, the module for interaction of the antivirus with the TSF 310 is configured to control the interaction of the antivirus 140 with the TSF manager 210, data processing, and transmission of the results to the user interface display module 152 to the application 150c. During the data processing, the module for interaction of the antivirus with the TSF 310 asks the TSF manager 210 to determine whether it is ready to process the data received from the input device 110.

In one example aspect, the module for working with the antivirus 151 is configured to receive the data from the module for working with applications 142, processes it (e.g., convert the sequence of symbols received into a text from) and transmits it to the module for working with the TSF 153.

In one example aspect, the module for working with the TSF 153 is configured to send the text data to the TSF manager 210 for processing, and then receives the processed data therefrom, and sends this processed data to the user interface display module 152 for proper display in the browser 150c.

The system 300 for protected transfer of data from an input device, such as a keyboard, to application input elements, such as a browser, operates as follows:

The user 170 via the browser 150c goes for example to his bank site, and enters confidential information into the entry field. Upon pressing the keys on the keyboard 110, signals from the keyboard 110 go to the computer and the keyboard driver 120. The keyboard driver 120 interprets the signals in the form of commands comprehensible to the operating system and transmits to the driver filter 141 the code of the key and its status (pressed or released). The driver filter 141 of the antivirus 140 receives the data from the keyboard driver 120, and transmits it depending on the operating mode of the antivirus 140 to the module for working with applications 142 or to the module for processing data from the input device 130. The module for working with applications 142 receives the data from the driver filter 141, checks whether the data is destined for the browser 150c and transmits it, bypassing the operating system, to the module for working with the antivirus 151 of the module for interaction of the antivirus with the TSF 310 or, if the data is destined for another application 160, to the module for processing data from the input device 130. The module for working with the antivirus 151 receives the data from the module for working with applications 142, processes it (for example, converts the sequence of symbols received into a text from) and transmits it to the module for working with the TSF 153. The module for working with the TSF 153 sends the text data to the TSF manager 210 for processing, and then receives the processed data therefrom and sends this processed data to the user interface display module 152 for proper display in the browser 150c. The TSF manager 210 determines what type of data is required (such as Chinese characters), and depending on this processes the received data and transforms it accordingly, if necessary providing the user with an interface for manipulation of the data (for example, for selecting which character was entered), and sends the processed data back to the module for working with the TSF 153. The user interface display module 152 receives the data which needs to be displayed from the module for working with the antivirus 151, processes it, and displays it in the browser (for example, on the page of the site being displayed).

In some example applications, the plug-ins and interface display module 152 are started in separate streams (or even separate processes), and also the interaction with the TSF manager 210 can only occur within a single stream. In these example applications, the module for working with the TSF 153 works in the same stream as the user interface display module 152. In one example aspect, when the module for working with the TSF 153 is an external component and cannot be connected to the browser as a plug-in, it may be incorporated into the browser in another way, for example with the use of interprocess interaction means (such as the exchange of messages, signals, sockets, registered channels, etc.) or by an injection of code for working with the TSF into the process of the user interface display module 152.

Accordingly, the system 300 provides protection against unauthorized access to user data on the route from the input device to the user interface display module, as well as a correct interpretation of the user input in the event of using texts in non-English languages, such as East Asian languages, handwritten texts, or voice input.

The following is an example of operation of the system 300:

A user 170, using the browser Google Chrome 150c, goes to the page of his bank and enters information about the details of his credit card in the entry field in order to perform a money transfer. This information is confidential, and its theft (for example, with the aid of keylogger programs) may cause substantial financial losses to the user 170. When the keys are pressed on the keyboard 110, signals go to the personal computer of the user 170, which are received by the keyboard driver 120 and interpreted into data containing the scan code of the key and its status flag (pressed or released). The keyboard driver 120 sends the obtained data on to the stack of drivers, where it is intercepted by the driver filter 141 of the antivirus 140, such as Kaspersky® Internet Security. Depending on the operating mode of the antivirus 140, the data intercepted by the driver filter goes on for further processing to the module for working with applications 142, then to the pool of drivers (being an implementation of the module for processing data from the input device 130) or to both modules at the same time. In the event that the user is working with a banking website, the data will be sent only to the first module, in order to rule out any chance of a theft. The module for working with applications 142 sends the data to the module for working with the antivirus 151, which may be a plug-in of the web browser, such as Google Chrome®. The module for working with the antivirus 151 forms a preliminary text from the data obtained from the module for working with applications 142 of the antivirus 140, using the memorized key statuses (for example, the Shift key was pressed, the Caps Lock pressed down, and so on), and sends this by the module for interprocess interaction to the module for working with the TSF 153. Since plug-ins in Google Chrome work in separate processes from the user interface display module 152, and the TSF manager 210, due to its specific nature, works in the same process as the user interface display module 152, the module for working with the TSF 153 cannot be implemented as part of the functionality of the plug-in 151. Therefore, it is implemented as an independent module, which may be injected by the antivirus 140 into the same process of the Google Chrome browser in which the user interface display module 152 is working. The module for working with the TSF 153 asks the TSF manager 210 if it is possible to process the provided data by the TSF module. If this is not possible, the data is processed by the module for working with the antivirus 151, and the text is formed and sent to the user interface display module 152, which displays the obtained text in the corresponding page entry field. But if the TSF manager 210 is able to process the data provided thereto, then the module for working with the TSF 153 sends this data to the TSF manager 210 for processing, obtains the result of the processing in the form of a text (for example, in UTF32 encoding) and transmits this via the module for working with the antivirus 151 to the user interface display module 152, which in turn displays the obtained text in the corresponding entry field of the page.

The following is another example of operation of the system 300:

The user 170 enters, from a graphic tablet 110 using a stylus, confidential information in the entry field of an online banking application 150c. Signals on the movement of the stylus arrive at the personal computer of the user 170, and are received by the graphic tablet driver 120 and interpreted into data containing coordinates of the position of the stylus. The graphic tablet driver 120 relays the data received on through the driver stack, where it is intercepted by the driver filter 141 of the antivirus Kaspersky Internet Security 140. Depending on the operating mode of the antivirus 140, the data intercepted by the driver filter goes for further processing to the module for working with applications 142, then to the pool of drivers (which is an implementation of the module for processing data from the input device 130) or to both modules at the same time. The module for working with applications 142 transmits the data received to the module for interaction of the antivirus with the TSF 310. When the online banking application 150c does not have the capability of connecting a plug-in, the module for working with the antivirus 151 and the module for working with the TSF 153 are implemented within a single module, e.g., the module for interaction of the antivirus with the TSF 310, which in turn is introduced by the method of injection into the online banking application 150c. Since the TSF manager 210, due to its special features, works in the same process as the user interface display module 152, the module for interaction of the antivirus with the TSF 310 also works in this same process. Therefore, it is implemented as a module which can be injected by the antivirus 140 into the same process of the online banking application in which the user interface display module 152 is working. The module for working with the TSF 153 asks the TSF manager 210 if it is possible to process the provided data by the TSF module. If the TSF manager 210 is able to process the data provided thereto, then the module for working with the TSF 153 sends this data to the TSF manager 210 for processing, obtains the result of the processing in the form of a text (for example, in UTF32 encoding) and transmits this via the module for working with the antivirus 151 to the user interface display module 152, which in turn displays the obtained text in the corresponding entry field of the application.

Figure 4:
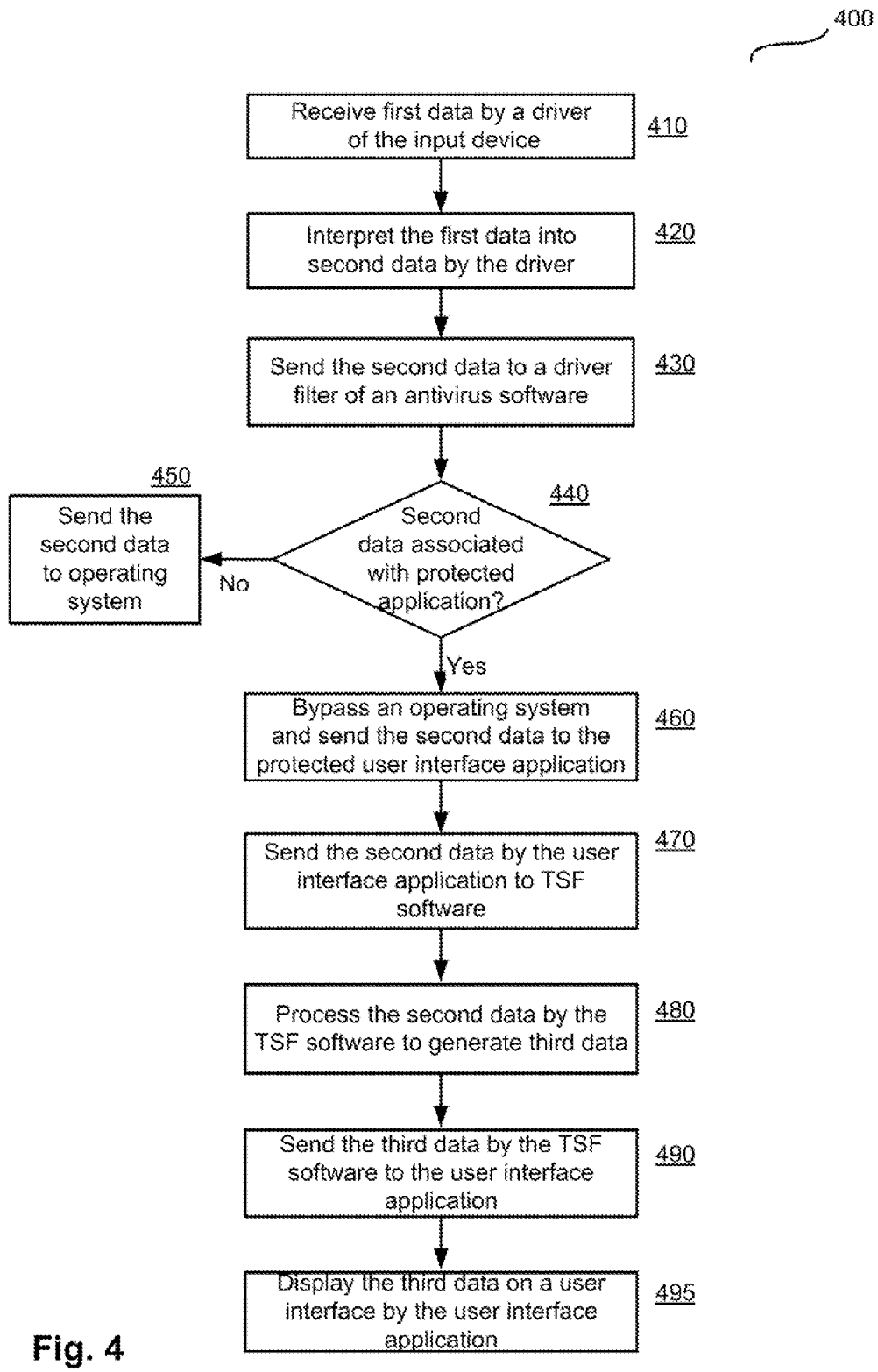
FIG. 4 shows a flow diagram of an example method for secure transfer of data from input devices to an application with the use of the driver filter of an antivirus product and the TSF technology according to one example aspect of the present invention.

FIG. 4 shows an example method for protected transfer of data from an input device according to one example aspect. At step 410, the method 400 includes receiving first data by a driver of the input device. The first data, such as a text in a non-English language, a handwritten input, and a voice input, being input by a user via the input device. At step 420, the method 400 includes interpreting the first data into second data by the driver of the input device. The second data comprises commands comprehensible to the operating system. At step 430, the method 400 includes sending the second data by the driver to a driver filter of an antivirus software. At step 440, the method 400 includes determining, by the antivirus software, whether to send the second data is associated with a user interface application protected by an antivirus software. At step 450, the method 400 includes, when the second data is not associated with a protected application, sending the second data to the operating system for further processing. At step 460, the method 400 includes, when the second data is determined to be associated with a protected user interface application, bypassing an operating system and sending the second data to the user interface application by the antivirus software. At step 470, the method 400 includes sending the second data by the user interface application to a TSF software. At step 480, the method 400 includes processing the second data by the TSF software to generate third data. The third data comprises human readable and editable text. At step 490, the method 400 includes sending the third data by the TSF software to the user interface application. At step 495, the method 400 includes displaying the third data on a user interface by the user interface application.

Figure 5:
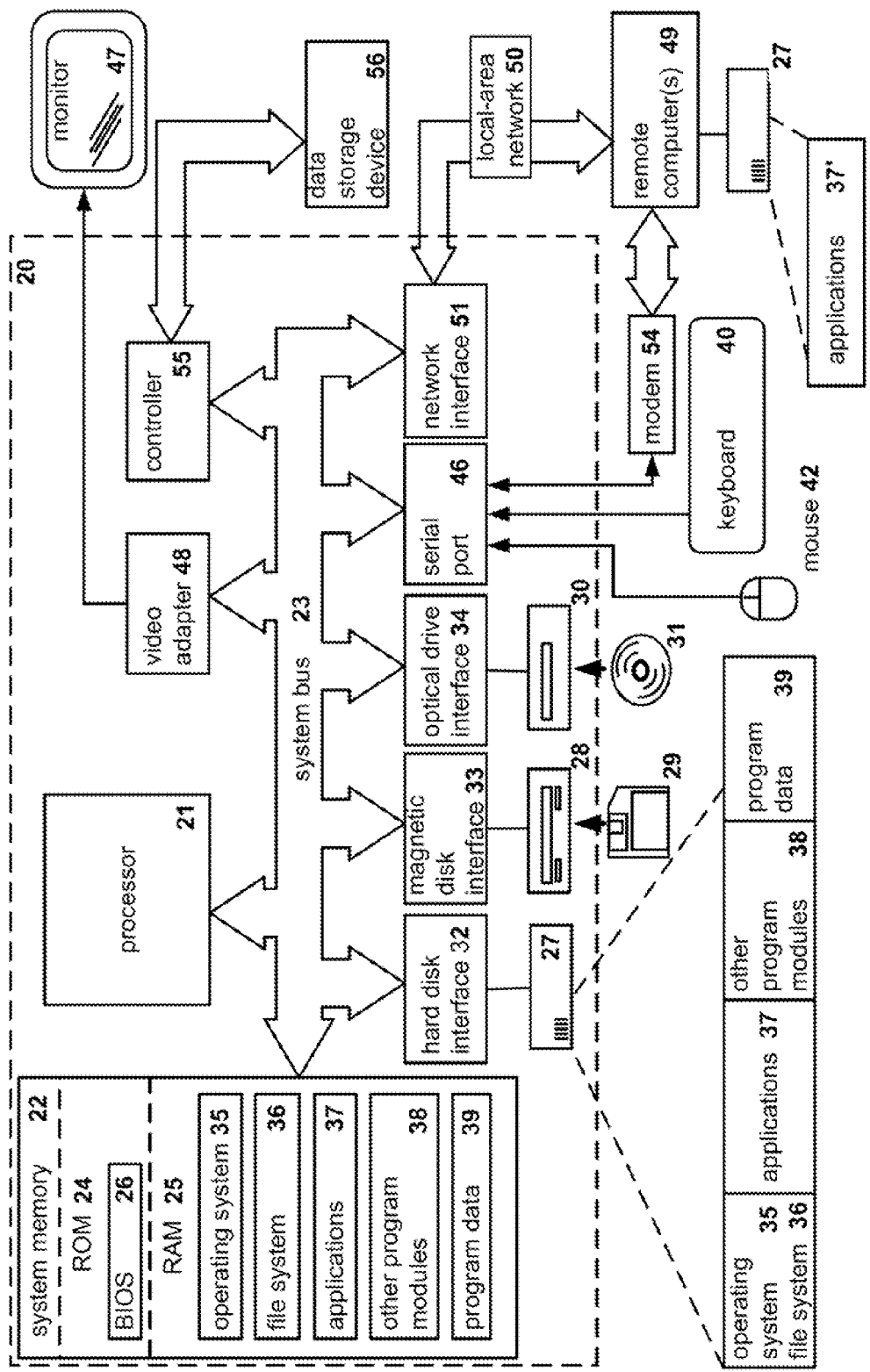
FIG. 5 shows an example of a general-purpose computer system, a personal computer or server, which may be used to implement the systems and methods disclosed herein.

FIG. 5 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for secure transfer of data from an input device to a user interface application, the method comprising:
   receiving first data by a driver of the input device, the first data being input by a user via the input device, wherein the first data comprises one or more of: a text in a non-English language, a handwritten input, and a voice input;
   interpreting the first data into second data by the driver of the input device;
   sending the second data by the driver to a driver filter of an antivirus software;
   determining, by the antivirus software, whether the second data is associated with a user interface application protected by the antivirus software;
   when the second data is associated with a user interface application protected by the antivirus software, bypassing an operating system and sending the second data to the user interface application by the antivirus software;
   sending the second data by the user interface application to a Text Services Framework (TSF) software;
   processing the second data by the TSF software to generate third data;
   sending the third data by the TSF software to the user interface application; and
   displaying the third data on a user interface by the user interface application.

2. The method of claim 1, wherein the second data comprises commands comprehensible to the operating system.

3. The method of claim 1, wherein the third data comprises human readable and editable text.

4. The method of claim 1, wherein the input device is a peripheral for entering data or signals.

5. The method of claim 1, wherein determining, by the antivirus software, whether to send the second data to the user interface application is performed based on an operating mode of the antivirus software.

6. The method of claim 1, wherein determining, by the antivirus software, whether to send the second data to the user interface application comprises:
   determining whether the user interface application is on a list of applications protected by the antivirus software; and
   when the user interface application is on the list of applications protected by the antivirus software, determining to send the second data to the user interface application.

7. A system for secure transfer of data from an input device to a user interface application, the system comprising:
   a processor configured to:
      receive first data by a driver of the input device, the first data being input by a user via the input device, wherein the first data comprises one or more of: a text in a non-English language, a handwritten input, and a voice input;
      interpret the first data into second data by the driver of the input device;
      send the second data by the driver to a driver filter of an antivirus software;
      determine, by the antivirus software, whether the second data is associated with a user interface application protected by the antivirus software;
      when the second data is associated with a user interface application protected by the antivirus software, bypass an operating system and send the second data to the user interface application by the antivirus software;
      send the second data by the user interface application to a Text Services Framework (TSF) software;
      process the second data by the TSF software to generate third data;
      send the third data by the TSF software to the user interface application; and
      display the third data on a user interface by the user interface application.

8. The system of claim 7, wherein the second data comprises commands comprehensible to the operating system.

9. The system of claim 7, wherein the third data comprises human readable and editable text.

10. The system of claim 7, wherein the input device is a peripheral for entering data or signals.

11. The system of claim 7, wherein the processor determines by the antivirus software, whether to send the second data to the user interface application based on an operating mode of the antivirus software.

12. The system of claim 7, wherein the processor determines, by the antivirus software, whether to send the second data to the user interface application by:
   determining whether the user interface application is on a list of applications protected by the antivirus software; and when the user interface application is on the list of applications protected by the antivirus software, determining to send the second data to the user interface application.

13. A computer program product stored on a non-transitory computer-readable storage medium, the computer program product comprising computer-executable instructions for secure transfer of data from an input device to a user interface application, including instructions for:
- receiving first data by a driver of the input device, the first data being input by a user via the input device, wherein the first data comprises one or more of: a text in a non-English language, a handwritten input, and a voice input;
- interpreting the first data into second data by the driver of the input device;
- sending the second data by the driver to a driver filter of an antivirus software;
- determining, by the antivirus software, whether the second data is associated with a user interface application protected by the antivirus software;
- when the second data is associated with a user interface application protected by the antivirus software, bypassing an operating system and sending the second data to the user interface application by the antivirus software;
- sending the second data by the user interface application to a Text Services Framework (TSF) software;
- processing the second data by the TSF software to generate third data;
- sending the third data by the TSF software to the user interface application; and
- displaying the third data on a user interface by the user interface application.

14. The computer program product of claim 13, wherein the second data comprises commands comprehensible to the operating system.

15. The computer program product of claim 13, wherein the third data comprises human readable and editable text.

16. The computer program product of claim 13, wherein determining, by the antivirus software, whether to send the second data to the user interface application is performed based on an operating mode of the antivirus software.

17. The computer program product of claim 13, wherein determining, by the antivirus software, whether to send the second data to the user interface application comprises:
- determining whether the user interface application is on a list of applications protected by the antivirus software; and
- when the user interface application is on the list of applications protected by the antivirus software, determining to send the second data to the user interface application.

* * * * *